(12) United States Patent
Yunazar et al.

(10) Patent No.: US 8,900,708 B2
(45) Date of Patent: Dec. 2, 2014

(54) RESIN-COATED METAL PIGMENT, AND PROCESS FOR PRODUCING SAME

(75) Inventors: Fahmi Yunazar, Tokyo (JP); Shigeki Katsuta, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 303 days.

(21) Appl. No.: 13/394,241

(22) PCT Filed: Sep. 18, 2009

(86) PCT No.: PCT/JP2009/066392
§ 371 (c)(1),
(2), (4) Date: Mar. 5, 2012

(87) PCT Pub. No.: WO2011/033655
PCT Pub. Date: Mar. 24, 2011

(65) Prior Publication Data
US 2012/0165454 A1 Jun. 28, 2012

(51) Int. Cl.
| | |
|---|---|
| B32B 5/16 | (2006.01) |
| B05D 7/00 | (2006.01) |
| B05D 1/18 | (2006.01) |
| B32B 15/20 | (2006.01) |
| B32B 3/00 | (2006.01) |
| B32B 7/02 | (2006.01) |
| B82Y 30/00 | (2011.01) |
| C09C 1/64 | (2006.01) |
| C09C 3/10 | (2006.01) |

(52) U.S. Cl.
CPC . *B05D 1/18* (2013.01); *B32B 15/20* (2013.01); *B32B 3/00* (2013.01); *B32B 7/02* (2013.01); *B82Y 30/00* (2013.01); *C09C 1/644* (2013.01); *C09C 3/10* (2013.01); *C01P 2004/04* (2013.01)
USPC .......................... 428/407; 427/215; 427/220

(58) Field of Classification Search
CPC .............. B05D 1/40; B05D 5/04; B05D 5/08; B05D 7/14; B05D 2202/00; B05D 2202/25; B32B 3/00; B32B 7/02; B32B 15/20; C90C 3/10; C90C 1/644
USPC ........................... 428/403, 407; 427/212–220
See application file for complete search history.

(56) References Cited

U.S. PATENT DOCUMENTS

| | | | | |
|---|---|---|---|---|
| 4,071,225 A | * | 1/1978 | Holl | ............................... 366/114 |
| 4,118,797 A | * | 10/1978 | Tarpley, Jr. | .................... 366/127 |

(Continued)

FOREIGN PATENT DOCUMENTS

| | | |
|---|---|---|
| EP | 0572128 A2 | 12/1993 |
| EP | 0703192 | 3/1996 |

(Continued)

OTHER PUBLICATIONS

Search report from International Application No. PCT/JP2009/066392, mail date is Nov. 17, 2009.

(Continued)

*Primary Examiner* — Holly Le
(74) *Attorney, Agent, or Firm* — Greenblum & Bernstein, P.L.C.

(57) ABSTRACT

Disclosed is a resin-coated metal pigment comprising 100 parts by weight of a metal pigment and 0.1 to 50 parts by weight of a resin, wherein the resin is attached on the surface of the metal pigment. The resin-coated metal pigment is produced by circulating a portion of a slurry solution containing the metal pigment in an external-circulation type vessel during the resin coating treatment in a reaction vessel and applying a vibration to the external-circulation type vessel with an ultrasonic wave.

8 Claims, 4 Drawing Sheets

ONE EXAMPLE OF TEM PHOTOGRAPHS IN EXAMPLE 5

(56) References Cited

U.S. PATENT DOCUMENTS

| | | | |
|---|---|---|---|
| 4,750,940 A * | 6/1988 | Higashi et al. | 524/439 |
| 5,032,425 A * | 7/1991 | Livsey et al. | 427/487 |
| 5,431,956 A | 7/1995 | Robb et al. | |
| 7,767,018 B2 * | 8/2010 | Nakajima et al. | 106/403 |
| 8,530,049 B2 * | 9/2013 | Setoguchi et al. | 428/407 |
| 2005/0227077 A1 | 10/2005 | Sugiyama et al. | |
| 2006/0240259 A1 | 10/2006 | Toyoda et al. | |
| 2007/0265372 A1 | 11/2007 | Liu | |
| 2009/0131584 A1 | 5/2009 | Terao et al. | |
| 2014/0079892 A1 * | 3/2014 | Yunazar et al. | 427/601 |

FOREIGN PATENT DOCUMENTS

| | | |
|---|---|---|
| EP | 1 721 952 A2 | 11/2006 |
| EP | 1721952 | 11/2006 |
| EP | 1950257 A1 | 7/2008 |
| GB | 2227739 A | 8/1990 |
| JP | 62-253668 | 11/1987 |
| JP | 1-49746 | 10/1989 |
| JP | 64-40566 | 10/1989 |
| JP | 2-233770 | 9/1990 |
| JP | 6-49109 | 2/1994 |
| JP | 08-176461 | 7/1996 |
| JP | 2000-044835 | 2/2000 |
| JP | 2000-44835 | 2/2000 |
| JP | 2000-351916 | 12/2000 |
| JP | 2002-121423 A | 4/2002 |
| JP | 2004-168846 | 6/2004 |
| JP | 2006-022384 | 1/2006 |
| JP | 2006-22384 | 1/2006 |
| JP | 2007-043453 | 4/2007 |
| JP | 2009-227798 | 10/2009 |
| JP | 2009-227798 A | 10/2009 |
| JP | 2010-180322 | 8/2010 |
| KR | 10-2008-0056146 A | 6/2008 |
| WO | 96/38506 | 12/1996 |

OTHER PUBLICATIONS

Singapore Office Action issued with respect to counterpart Singapore Patent Application No. 201201260-5, dated Feb. 27, 2013.

Korean Office Action, mail date is Aug. 30, 2013, with translation thereof.

Search report and written opinion from Singapore application No. 2013059266, mail date is Jul. 3, 2014.

\* cited by examiner

ONE EXAMPLE OF TEM PHOTOGRAPHS IN EXAMPLE 5

ONE EXAMPLE OF TEM PHOTOGRAPHS IN COMPARATIVE EXAMPLE 1

RESIN-COATED METAL PIGMENT, AND PROCESS FOR PRODUCING SAME

TECHNICAL FIELD

The present invention relates to a new resin-coated metal pigment and a process for producing the same, more particularly to a metal pigment which gives a metallic coating film excellent in adhesiveness and chemical resistance while maintaining an unprecedented excellent metallic luster and designability, when the pigment is used as a pigment for coating materials, and to a process for producing such a pigment.

BACKGROUND ART

A metal pigment has conventionally been used for metallic paints, printing ink, plastic kneading and the like for the purpose of obtaining a beautiful decoration effect in which much importance is attached to a metallic feeling. Although an aluminum pigment having a surface not subjected to any treatment has a high metallic feel and designability, it has poor adhesiveness with a resin in a coating film depending on a resin system of coating materials and printing ink. As a result, it had disadvantages of easy peeling when an adhesion test by cellophane tape peeling was performed, and of having no protective function to a chemical.

This is probably because compatibility and wettability between the surface of aluminum pigment and a resin of coating materials and printing ink are insufficient. Therefore, a method of subjecting the aluminum pigment to surface treatment has been proposed as a measure of improvement thereof.

Patent Document 1 proposes a method in which a flaky aluminum powder or a paste of the flaky aluminum powder, which is an aluminum pigment, is dispersed in an organic solvent, first allowing a radically polymerizable unsaturated carboxylic acid or the like to be absorbed by the powder, and then coating the surface of the powder with a polymer produced from a monomer having 3 or more radically polymerizable double bonds. Although this method improves adhesiveness, it has a problem that it is necessary to add a considerable amount of a coating monomer in order to achieve chemical resistance of a metallic coating film that is originally the main purpose, resulting in simultaneous reduction in metallic feel and significant reduction in designability.

Patent Document 2 proposes a method for improving a surface coating method to form a coating film that is uniform and highly three-dimensionally crosslinked in order to prevent reduction in the color tone of a resin-coated metal pigment and to further improve chemical resistance and weatherability. However, although reduction in metallic feel and designability is improved to some extent by this method, the color tone of a resin-coated metal pigment is considerably inferior to the color tone of a metal pigment which has not been subjected to surface coating treatment, and is not sufficient.

Further, in a region where the average particle size is 10 micrometers or less, in which particularly high designability is required recently, the problem is that the average particle size after resin coating treatment is significantly increased compared with that before the treatment, resulting in significant reduction in color tone such as luster, hiding properties, and a flip-flop feeling when a coating film is formed.

Patent Document 3 discloses a method of using an ultrasonic wave when mica is coated with a resin. However, an aluminum pigment is not mentioned, and there is no discussion at all with respect to color tone, chemical resistance and adhesiveness which are important properties for an aluminum pigment.

PRIOR ART

Patent Document

Patent Document 1: JP 01-49746 B
Patent Document 2: WO96/38506
Patent Document 3: JP 02-233770 A

SUMMARY OF INVENTION

Problem to be Solved by the Invention

It is an object of the present invention to provide a resin-coated metal pigment from which the disadvantages of prior arts as described above have been eliminated, and a new method for producing the same; specifically, to provide a resin-coated metal pigment which shows only a small reduction in color tone such as luster, hiding properties, and a flip-flop feeling due to the resin coating and has excellent adhesiveness and chemical resistance, and a new method for producing the same.

Means for Solving the Problems

The present inventors have found a production method that has not been investigated including adding an external action such as ultrasonic irradiation during resin coating treatment, and thereby obtained a resin-coated metal pigment having excellent color tone, adhesiveness and chemical resistance. This finding has led to the completion of the present invention.

Specifically, the present invention is as follows.

(1) A resin-coated metal pigment comprising 100 parts by weight of a metal pigment and 0.1 to 50 parts by weight of a resin adhering to a surface of the metal pigment, wherein the resin-coated metal pigment is obtained by circulating a part of a slurry solution containing the metal pigment through an external circulation type container during resin coating treatment in a reaction vessel and applying an ultrasonic vibration to the external circulation type container.

(2) The resin-coated metal pigment according to (1) as described above, comprising 100 parts by weight of a metal pigment and 0.1 to 50 parts by weight of a resin adhering to a surface of the metal pigment, wherein the resin-coated metal pigment is obtained by circulating a part of a slurry solution containing the metal pigment through an external circulation type container during resin coating treatment in a reaction vessel, directly attaching an ultrasonic transducer to an outside of the external circulation type container and applying an ultrasonic wave to the slurry solution inside the container through an outer wall of the container.

(3) A resin-coated metal pigment, wherein a difference between an average particle size of particles of a resin-coated metal pigment and an average particle size of particles of a metal pigment before being coated with a resin is larger than 0 and 5 μm or less.

(4) A resin-coated metal pigment, wherein a proportion between (A) the number of particles contained in aggregates formed from two or more primary particles and (B) the number of primary particles which are not aggregated, B/(A+B), in the resin-coated metal pigment, is 0.3 to 1.

(5) A resin-coated metal pigment, wherein unevenness of a resin coating layer adhering to a surface of the resin-coated metal pigment is 25 nm or less.

(6) A resin-coated metal pigment, wherein the resin-coated metal pigment has an average surface roughness Ra of 20 nm or less and an average height Rc of unevenness of a surface roughness curve of 80 nm or less.

(7) A resin-coated metal pigment having an alkali resistance represented by color difference ΔE of less than 1.0, wherein the alkali resistance is evaluated by a method in which when a coated plate obtained by coating an acrylic resin with a coating material containing the resin-coated metal pigment is immersed in a 2.5 N sodium hydroxide solution at 20° C. for 24 hours, the alkali resistance is represented by color difference ΔE between an immersion part and a non-immersion part.

(8) A resin-coated metal pigment, wherein the amount of gas generated is 10 ml or less when an aqueous coating material containing the resin-coated metal pigment is kept warm at 40° C. for 8 hours.

(9) A method for producing a resin-coated metal pigment comprising 100 parts by weight of a metal pigment and 0.1 to 50 parts by weight of a resin adhering to a surface of the metal pigment, the method comprising applying an ultrasonic vibration during resin coating treatment.

(10) A method for producing a resin-coated metal pigment comprising 100 parts by weight of a metal pigment and 0.1 to 50 parts by weight of a resin adhering to a surface of the metal pigment, the method comprising circulating a part of a slurry solution containing the metal pigment through an external circulation type container during resin coating treatment in a reaction vessel and applying an ultrasonic vibration to the external circulation type container.

(11) The method for producing a resin-coated metal pigment comprising 100 parts by weight of a metal pigment and 0.1 to 50 parts by weight of a resin adhering to a surface of the metal pigment according to (10) as described above, the method comprising circulating a part of a slurry solution containing the metal pigment through an external circulation type container during resin coating treatment in a reaction vessel, directly attaching an ultrasonic transducer to an outside of the external circulation type container and applying an ultrasonic wave to the slurry solution in the container through an outer wall of the container.

(12) The resin-coated metal pigment according to any one of (1) to (8) as described above, wherein the metal pigment is an aluminum pigment.

(13) The method according to any one of (9) to (11) as described above, wherein the metal pigment is an aluminum pigment.

Advantageous Effects of Invention

The resin-coated metal pigment of the present invention is a resin-coated metal pigment having excellent color tone, adhesiveness, and chemical resistance, which is obtained by adding an external action such as ultrasonic irradiation to an external circulation apparatus during resin coating treatment. When the resin-coated metal pigment of the present invention is used for a coating material, it is possible to obtain a coating film which has a color tone that is very close to the color tone when a metal pigment before resin coating is used and is excellent in adhesiveness and chemical resistance.

DESCRIPTION OF EMBODIMENTS

Figure 1:
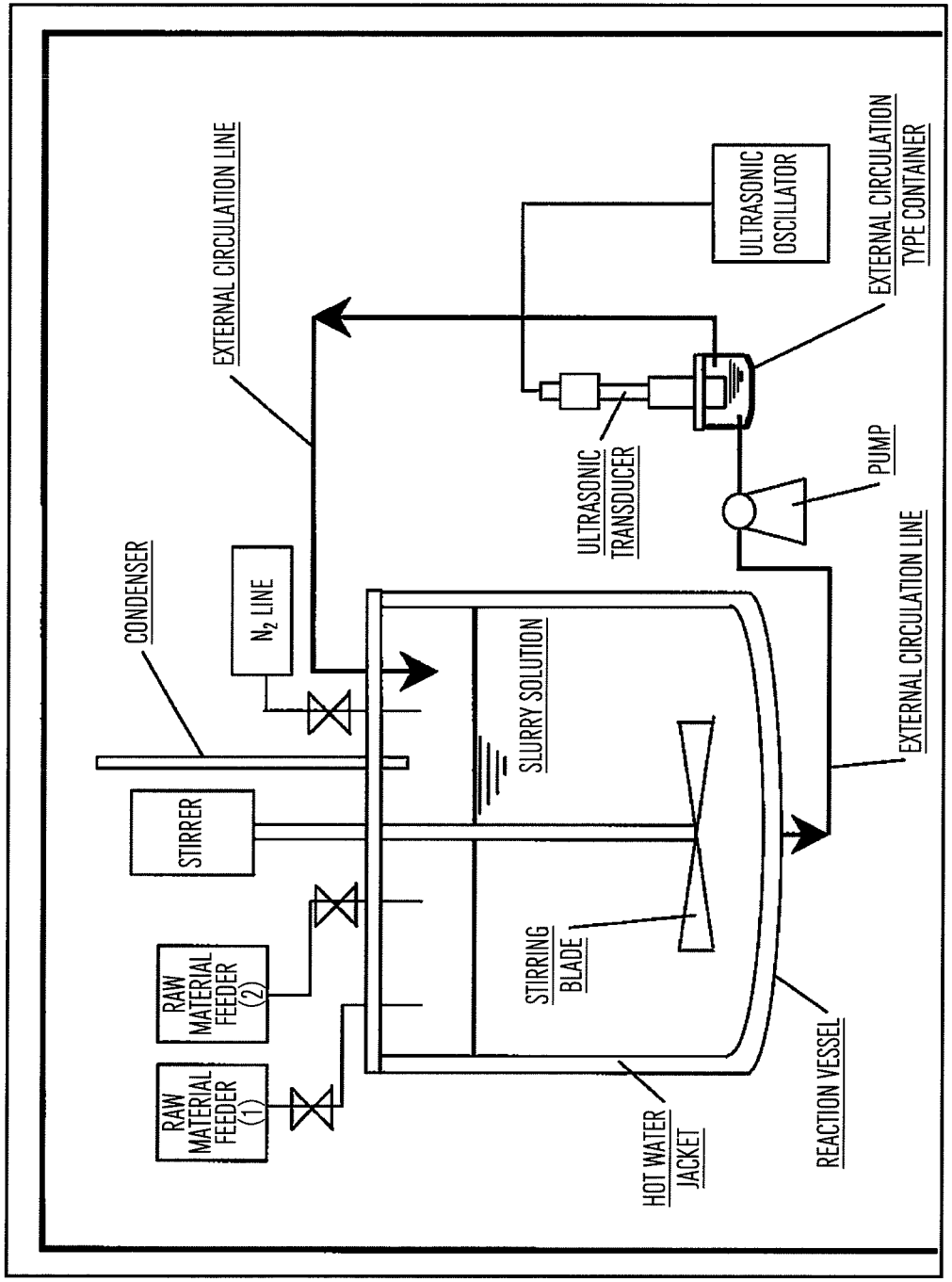
FIG. 1 is a schematic view of an experimental device used in Example 1.

Hereinafter, the present invention is described in more detail with reference to embodiments.

The method for producing the resin-coated metal pigment may include dispersing metal pigment particles in a solvent, adding a monomer and/or an oligomer having one or more double bonds in a molecule while providing an external vibrational action, and further adding a polymerization initiator to perform a polymerization reaction to coat the surface of the metal pigment particles with a resin. The polymerization reaction is desirably performed under conditions of a temperature of 50° C. to 150° C. for 5 minutes to 12 hours. The polymerization is desirably performed in an inert gas atmosphere of nitrogen, helium, or the like, in order to increase polymerization efficiency. After the completion of the polymerization, the resulting resin-coated metal pigment may be formed into a paste by separating the organic solvent by filtration and adjusting non-volatile matter to 20 to 80%. Other solvents, additives, and the like may be optionally contained in the paste.

As the metal pigment used for the present invention, it is preferred to use a base metal powder such as aluminum, zinc, iron, magnesium, copper, and nickel, and an alloy powder thereof. Particularly suitable is an aluminum powder frequently used as metallic pigments. An aluminum powder having surface properties such as surface glossiness, whiteness and luster required for metallic pigments, particle sizes, and shapes is suitable as the aluminum powder used for the present invention. The metal pigment may have various shapes such as granular, tabular, massive, and scaly, but a scaly shape is preferred to give an excellent metallic feeling and glossiness to the coating film. For example, an aluminum powder having a thickness in the range of 0.001 to 1 μm and a length or width in the range of 1 to 100 μm is preferred. The aspect ratio is preferably in the range of 10 to 20000. Here, the aspect ratio refers to the average major axis of a scaly aluminum powder divided by the average thickness of the aluminum powder. The purity of aluminum powder is not particularly limited, but the purity of the aluminum powder used for coating materials is 99.5% or more. The aluminum powder is generally commercially available as a paste, and it is preferred to use the same.

The resin used for the present invention is preferably obtained by subjecting a monomer and/or an oligomer having one or more double bonds in a molecule to polymerization reaction.

The monomer having one or more double bonds is not particularly limited, but a conventionally known monomer can be used. Specific examples which can be suitably used include: unsaturated carboxylic acids (for example, acrylic acid, methacrylic acid, itaconic acid, fumaric acid, citraconic acid, crotonic acid, and maleic acid or maleic anhydride); mono- or di-esters of phosphoric acid or phosphoric acid (for example, 2-methacryloyloxyethyl phosphate, di-2-methacryloyloxyethyl phosphate, tri-2-methacryloyloxyethyl phosphate, 2-acryloyloxyethyl phosphate, di-2-acryloyloxyethyl phosphate, tri-2-acryloyloxyethyl phosphate, diphenyl-2- acryloyloxyethyl phosphate, dibutyl-2-methacryloyloxyethyl phosphate, dioctyl-2-acryloyloxyethyl phosphate, 2-methacryloyloxypropyl phosphate, bis(2-chloroethyl)vinyl phosphonate, diallyldibutyl phosphonosuccinate, 2-methacryloyloxyethyl phosphate, and 2-acryloyloxyethyl phosphate), coupling agents (for example, γ-methacryloxypropyltrimethoxysilane, 3-acryloxypropyltrimethoxysilane, vinyltrichlorosilane, vinyltriethoxysilane, vinyltrimethoxysilane, vinyltris(β-methoxyethoxy)silane, isopropyl isostearoyl diacryl titanate, acetoalkoxy aluminum diisopropylate, and zircoaluminate), nitriles of unsaturated carboxylic acids (for example, acrylonitrile and methacrylonitrile), and esters of unsaturated carboxylic acids (for example, methyl acrylate, ethyl acrylate, n-butyl acrylate, 2-ethylhexyl acrylate, lauryl acrylate, stearyl acrylate, hydroxyethyl acrylate, 2-hydroxypropyl acrylate, methoxyethyl acrylate, butoxyethyl acrylate, glycidyl acrylate, cyclohexyl acrylate, 1,6-hexanediol diacrylate, 1,4-butanediol diacrylate, triethylene glycol diacrylate, ethylene glycol dimethacrylate, triethylene glycol dimethacrylate, neopentyl glycol dimethacrylate, trimethylolpropane triacrylate, tetramethylolpropane tetraacrylate, tetramethylol propane methane triacrylate, trimethylolpropane trimethacrylate, tetramethylolmethane trimethacrylate, di-trimethylolpropane tetraacrylate, pentaerythritol tetraacrylate, di-pentaerythritol hexaacrylate, di-pentaerythritol pentaacrylate, di-pentaerythritol pentaacrylate monopropionate, triacrylformal, methyl methacrylate, ethyl methacrylate, n-butyl methacrylate, 2-ethylhexyl methacrylate, lauryl methacrylate, stearyl methacrylate, hydroxyethyl methacrylate, 2-hydroxypropyl methacrylate, methoxyethyl methacrylate, butoxyethyl methacrylate, glycidyl methacrylate, and cyclohexyl methacrylate).

Further, cyclic unsaturated compounds (for example, cyclohexene) and aromatic unsaturated compounds (for example, styrene, α-methylstyrene, vinyltoluene, divinylbenzene, cyclohexene vinylmonoxide, divinylbenzene monoxide, vinyl acetate, vinyl propionate, allyl benzene, or diallyl benzene) can also be suitably used.

In addition, an unsaturated compound having a functional group containing fluorine, silicon, nitrogen, or the like can also be used.

An oligomer having one or more double bonds in a molecule includes epoxidized 1,2-polybutadiene, acrylic-modified polyester, acrylic-modified polyether, acrylic-modified urethane, acrylic-modified epoxy, and acrylic-modified spirane, and one or more thereof can be mixed for use.

The use amount of the monomer and/or the oligomer having one or more double bonds in a molecule in the present invention is preferably from 0.1 part by weight to 50 parts by weight, more preferably from 1 part by weight to 30 parts by weight, based on 100 parts by weight of the metal component of the metal pigment.

The organic solvent used for dispersing the metal pigment therein may be any organic solvent which is inert to the metal pigment, and examples thereof include aliphatic hydrocarbons such as hexane, heptane, octane, and mineral spirit, aromatic hydrocarbons such as benzene, toluene, xylene, and solvent naphtha, ethers such as tetrahydrofuran and diethyl ether, alcohols such as ethanol, 2-propanol, and butanol, esters such as ethyl acetate and butyl acetate, glycols such as propylene glycol and ethylene glycol, glycol ethers such as propylene glycol monomethyl ether, propylene glycol monoethyl ether, ethylene glycol monoethyl ether, and ethylene glycol monobutyl ether, and glycol esters such as propylene glycol monomethyl ether acetate, propylene glycol monoethyl ether acetate, and ethylene glycol monomethyl ether acetate. These organic solvents may be used independently or in combination of two or more thereof.

The concentration of the metal pigment in the organic solvent is preferably 0.1 to 40% by weight, more preferably 1 to 35% by weight. The concentration of the metal pigment in the organic solvent is preferably 0.1% by weight or more in terms of efficiently coating the metal pigment with the resin. Further, the concentration of the metal pigment in the organic solvent is preferably 40% by weight or more in terms of keeping the dispersion state of the metal pigment uniform.

Note that in the present invention, the above organic solvent is also used as a reaction solvent in subjecting the monomer and/or the oligomer having one or more double bonds in a molecule to polymerization reaction to form a resin.

The polymerization initiator used for the present invention is generally known as a radical generator, and the type is not particularly limited. Examples of the polymerization initiator include peroxides such as benzoyl peroxide, lauroyl peroxide, and bis-(4-t-butylcyclohexyl)peroxydicarbonate, and azo compounds such as 2,2'-azobis-isobutyronitrile and 2,2'-azobis-2,4-dimethylvaleronitrile. The use amount thereof is not particularly limited because it is controlled by the reaction rate of each polymerizable monomer, but is preferably from 0.1 part by weight to 25 parts by weight based on 100 parts by weight of the metal pigment.

In producing the resin-coated metal pigment, it is important to use, as an external action, an external shearing action in combination with an external vibrational action. The external shearing action refers to an action which promotes physical dispersion by applying a high shearing force when the metal pigment is dispersed in the organic solvent and when the monomer is added to the dispersion. Examples of the methods therefor include a method for dispersing the metal pigment or the monomer using a disper or a stirrer. The external vibrational action refers to an action in which the above dispersion or slurry solution under polymerization reaction is mechanically strongly vibrated using a vibration generator or an ultrasonic generator to promote physical dispersion.

In the production method of the present invention, the apparatus for adding the external vibrational action includes: 1) an apparatus of directly applying an ultrasonic wave generated from an ultrasonic transducer to a slurry solution in an external circulation type container through an ultrasonic horn; 2) an apparatus of directly attaching an ultrasonic transducer to the outside of an external circulation type container to apply an ultrasonic wave through a wall of the external circulation type container to the slurry solution in the container; and 3) an apparatus of directly attaching an ultrasonic transducer to the outside of an external circulation type container, filling the container with a suitable solvent, and passing a pipe through which a slurry solution is circulated to thereby apply an ultrasonic wave to the slurry solution. Hereinafter, the external circulation type container to which an ultrasonic transducer is attached in this way is called a circulation type ultrasonic dispersion machine. The volume of the external circulation type container is not limited, but is preferably 0.0001 time to 10 times, more preferably 0.001 time to two times of the volume of the reaction vessel to which the container is connected.

The method of adding the external vibrational action in the present invention includes various methods including allowing a part of a slurry solution under polymerization reaction in a reaction vessel to circulate through an external circulation type container and adding, to the external circulation type container, the external vibrational action intermittently, continuously, or in combination of the intermittent addition and the continuous addition.

In the present invention, although the number of the circulation type ultrasonic dispersion machines to be installed is not particularly limited, it is desirable to install a plurality of machines. When a plurality of circulation type ultrasonic dispersion machines are used at the same time, a method of connecting these machines with the reaction vessel may be a series system or a parallel system. The parallel system is preferred from the point of view of production efficiency, and the series system is preferred from the point of view of the dispersion efficiency of the metal pigment.

The ultrasonic wave of the external action used for the present invention is a kind of elastic vibration propagating through an elastic body, and it is usually a longitudinal wave which provides compression and expansion propagating in the traveling direction of the wave, but a transverse wave may be present in a wall of an external circulation type container, a contact surface thereof, or the like. Note that in this specification the ultrasonic wave also includes a sound wave that is not for direct hearing purpose as a technical definition and all the sound waves that propagate through the surface or the inner part of liquid or solid. An ultrasonic wave having a frequency of 15 to 10000 kHz, preferably 20 to 3000 kHz, most preferably 30 to 1000 kHz is desired as the ultrasonic wave. The output is 5 to 20000 W, preferably 10 to 10000 W, most preferably 12 to 6000 W.

The resin-coated metal pigment of the present invention is characterized in that it has almost no reduction in the luster and hiding properties of coating film compared with a metal pigment before resin coating. This is probably because the surface of metal pigment particles can be coated with a resin with a higher degree of fineness and uniformity, in an unprecedentedly suitable dispersion state of the metal pigment particles. The uniformity can be evaluated by measuring the surface unevenness, the average surface roughness Ra, and the average height Rc of the unevenness of the surface roughness curve, of the resin-coated metal pigment.

The surface unevenness is measured by a method to be described below.

First, the resin-coated metal pigment is subjected to ultrasonic cleaning with excess methanol and chloroform as a pretreatment, and then it is vacuum-dried, dispersed and cleaned again with acetone, and then air-dried. Then, it is embedded with an epoxy resin and completely cured, followed by trimming and cutting a section. The cross section is observed with a transmission electron microscope (hereinafter abbreviated as TEM) to measure the distance between the height of a depression and that of a projection on the surface of the resin coating layer.

The unevenness of the resin-coated metal pigment is preferably 25 μm or less, more preferably 15 μm or less.

The average surface roughness Ra as referred to in this specification is calculated by the following method. As a method for observing surface morphology of the metal pigment, an atomic force microscope (hereinafter abbreviated as AFM) TMX-2010 (manufactured by Topometrix) is used. As the pretreatment, the resin-coated metal pigment as a sample is subjected to ultrasonic cleaning with excess methanol and chloroform, vacuum-dried, dispersed again in acetone, and then dropped on a Si wafer and air-dried. With respect to the quantitative analysis of the surface roughness by AFM, a surface roughness curve (a line profile of surface unevenness) is measured with 300 scans in a field of view of 5 μm square of a resin-coated metal pigment particle which is not overlapped with other resin-coated metal pigment particles to determine the arithmetic average roughness of the roughness curve (arithmetic average of the absolute values of the altitude within a reference length of 5 μm). The reference length depends on the average particle size $d_{50}$, but is on the basis of 5 μm. In the specification, a value obtained by measuring the arithmetic average roughness in three or more fields of view is then arithmetically averaged to obtain a value defined as the "average surface roughness Ra (nm)". The terminology of the surface roughness is based on JIS-B-0660:1998.

The average surface roughness Ra of the resin-coated metal pigment of the present invention is generally 20 nm or less, preferably 15 nm or less. When Ra is 20 nm or less, the pigment showed extremely excellent degree of luster and good flop properties because the regular reflectance of light at the surface was high.

The average height Rc of the unevenness of the surface roughness curve of the resin-coated metal pigment is represented by the sum of the average value of the absolute values of the height of the top of the surface roughness curve and the average value of the absolute values of the depth of the bottom of the surface roughness curve, in the surface roughness curve measured as described above. Specifically, it refers to a value obtained by measuring the arithmetic average height of the surface roughness curve in three or more fields of view and then arithmetically averaging the resulting values.

The average height Rc of the resin-coated metal pigment of the present invention is preferably 80 nm or less, more preferably 70 nm or less. When the average height Rc is 80 nm or less, the pigment showed extremely excellent degree of luster and good flop properties.

Further, the difference between the average particle size of the particles of the resin-coated metal pigment and the average particle size of the metal pigment before resin coating is preferably more than 0 and 5 μm or less.

Further, with respect to the resin-coated metal pigment of the present invention, the surface of the metal pigment particles is coated with a resin with a higher degree of fineness and uniformity than before. Therefore, the pigment has been improved in the chemical resistance in the coating film and the amount of gas generated when it is dispersed in an aqueous coating. When a color difference ΔE is determined according to JIS-Z-8730 (1980) 6.3.2 for evaluating chemical resistance, the ΔE is preferably less than 1.0. Further, the amount of gas generated which has been measured by a method described in the Examples is preferably 10 ml or less, more preferably 6 ml or less.

The resin-coated metal pigment of the present invention can be suitably used for motor vehicles, common household appliances, information home appliances typified by a cellular phone, printing, and coating of substrates such as metal such as iron and a magnesium alloy or a plastic, and can exhibit high designability.

Further, additives which are generally used in the coating material industry, such as pigment, dye, a wetting agent, a dispersant, a color separation inhibitor, a leveling agent, a slip additive, a rheology control agent, a viscosity controlling agent, an anti-skinning agent, an antigelling agent, a defoaming agent, a thickener, a dripping inhibitor, an antifungal agent, an ultraviolet absorber, a film-forming auxiliary agent, and a surfactant, may be arbitrarily added to the new resin-coated metal pigment of the present invention.

EXAMPLES

Next, the present invention will be described in detail with respect to the Examples. Note that % in the following descriptions represents % by weight.

Example 1

To a 20 L reaction vessel, were charged 1500 g of a commercially available aluminum paste (GX-5060, having "an average particle size of 6 µm and non-volatile matter of 72%", manufactured by Asahi Kasei Chemicals Corporation) and 8300 g of mineral spirit. The reaction vessel was stirred while introducing nitrogen gas, and the temperature in the system was increased to 70° C. Then, 4.3 g of acrylic acid was added, followed by continuing stirring for 30 minutes.

Subsequently, the reaction vessel was connected to a commercially available circulation type ultrasonic dispersion machine, and the slurry solution in the reaction vessel was circulated at a rate of about 1 l/min with a metering pump. The circulation type ultrasonic dispersion machine is of a type which directly irradiates the slurry solution in the vessel thereof with an ultrasonic wave through an ultrasonic horn. The schematic view of the experimental device used in Example 1 is shown in FIG. 1. In the vessel, 100 ml of the slurry solution is always held, and the slurry solution circulated in the vessel was directly irradiated with the ultrasonic wave having a frequency of 20 kHz and an output of 200 W for 60 minutes.

Then, there was produced a solution including 110.2 g of trimethylolpropane trimethacrylate, 48.6 g of ditrimethylolpropane tetraacrylate, 29.2 g of 2,2'-azobis-2,4-dimethylvaleronitrile, and 1200 g of mineral spirit. Then, the resulting solution was added to the reaction vessel at a rate of about 7.9 g/min with a metering pump, followed by polymerization for a total of six hours while keeping the temperature in the system at 70° C. Note that, during the polymerization, the slurry solution in the reaction vessel was continuously circulated through the circulation type ultrasonic dispersion machine, and the above ultrasonic irradiation was continuously performed for six hours. When the unreacted amount of trimethylolpropane trimethacrylate in the filtrate sampled after completion of polymerization was analyzed by gas chromatography, it was found that 99% or more of the amount added had been reacted. After completion of polymerization, the system was naturally cooled, and the slurry was filtered to obtain a resin-coated aluminum paste. The non-volatile matter in this paste determined according to JIS-K-5910 was found to be 50.1% by weight.

Example 2

A resin-coated aluminum paste was obtained in the same manner as in Example 1 except that the ultrasonic output in Example 1 was changed to 400 W. The non-volatile matter in this paste determined according to JIS-K-5910 was found to be 50.3% by weight.

Example 3

A resin-coated aluminum paste was obtained in the same manner as in Example 1 except that the ultrasonic output in Example 1 was changed to 600 W. The non-volatile matter in this paste determined according to JIS-K-5910 was found to be 50.0% by weight.

Example 4

Figure 2:
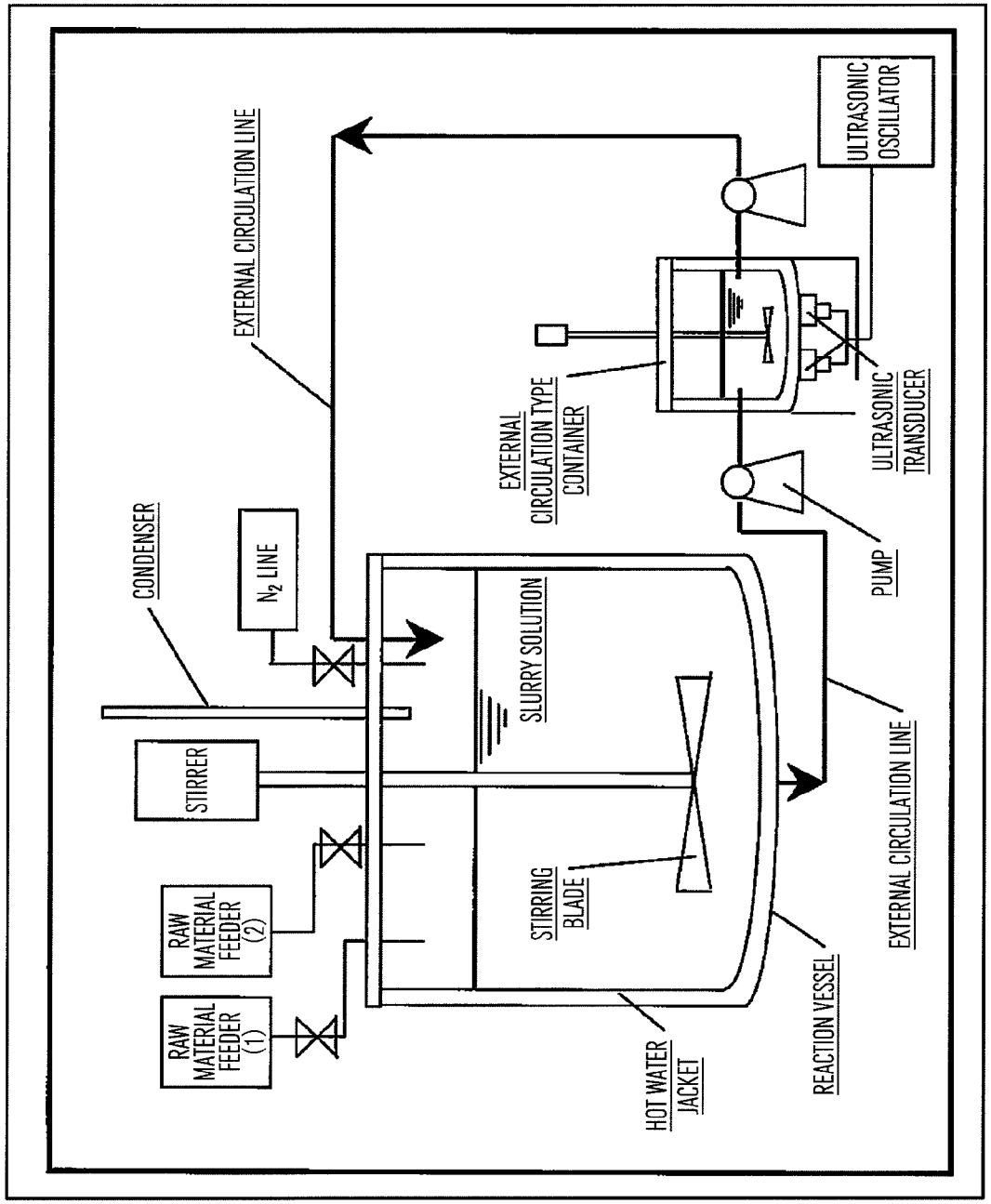
FIG. 2 is a schematic view of an experimental device used in Example 4.

Instead of the circulation type ultrasonic dispersion machine used in Example 1, there was used a circulation type ultrasonic dispersion machine of the type of directly attaching an ultrasonic transducer to the outside of an external circulation type container to apply an ultrasonic wave through a wall of the external circulation type container to the slurry solution in the container. This circulation type ultrasonic dispersion machine has a container which can always hold about 1.5 l of slurry solution therein, and the ultrasonic transducer is directly attached to the bottom of the container. A resin-coated aluminum paste was obtained in the same manner as in Example 1 except that this circulation type ultrasonic dispersion machine was used; the stirring time after adding acrylic acid was changed from 30 minutes to 60 minutes; and the slurry solution was irradiated with the ultrasonic wave having a frequency of 40 kHz and an output of 12 W during polymerization. The non-volatile matter in this paste determined according to JIS-K-5910 was found to be 50.1% by weight. The schematic view of the experimental device used in this Example is shown in FIG. 2.

Example 5

A resin-coated aluminum paste was obtained in the same manner as in Example 4 except that the ultrasonic output in Example 4 was changed to 90 W. The non-volatile matter in this paste determined according to JIS-K-5910 was found to be 50.0% by weight.

Example 6

A resin-coated aluminum paste was obtained in the same manner as in Example 4 except that the ultrasonic output in Example 4 was changed to 150 W. The non-volatile matter in this paste determined according to JIS-K-5910 was found to be 50.1% by weight.

Example 7

Figure 3:
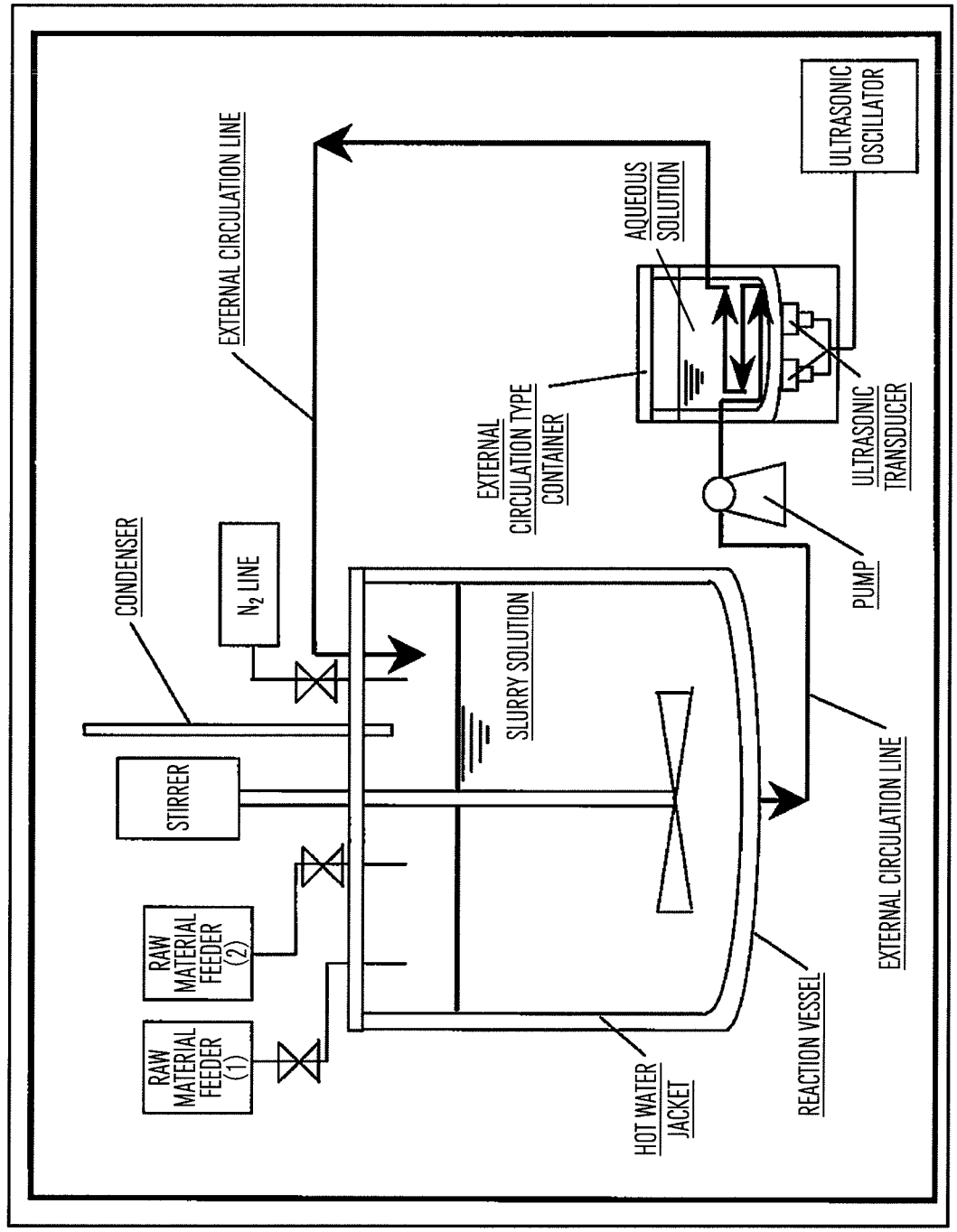
FIG. 3 is a schematic view of an experimental device used in Example 7.
Figure 4:
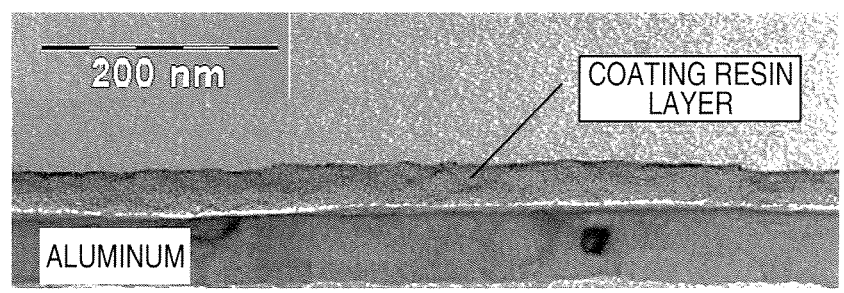
FIG. 4 is one example of TEM photographs of the resin-coated metal pigment of Example 5.
Figure 5:
FIG. 5 is one example of TEM photographs of the resin-coated metal pigment of Comparative Example 1.

Instead of the circulation type ultrasonic dispersion machine used in Example 1, there was used a circulation type ultrasonic dispersion machine of the type of directly attaching an ultrasonic transducer to the outside of an external circulation type container, filling the container with water, and passing an external circulation line through which a slurry solution is circulated to thereby indirectly apply an ultrasonic wave to the slurry solution. The schematic view of the experimental device used in this Example is shown in FIG. 3. A resin-coated aluminum paste was obtained in the same manner as in Example 1 except that the stirring time after adding acrylic acid was changed from 30 minutes to 60 minutes, and the slurry solution was irradiated with the ultrasonic wave having a frequency of 42 kHz and an output of 180 W during polymerization. The non-volatile matter in this paste determined according to JIS-K-5910 was found to be 49.9% by weight.

Example 8

A resin-coated aluminum paste was obtained in the same manner as in Example 7 except that the circulation velocity of the slurry solution was changed to 0.25 l/min, and the slurry solution was irradiated with the ultrasonic wave having a frequency of 42 kHz and an output of 180 W. The non-volatile matter in this paste determined according to JIS-K-5910 was found to be 50.1% by weight.

Comparative Example 1

A resin-coated aluminum paste was obtained in the same manner as in Example 1 except that no external vibrational action was performed at all. The non-volatile matter of the filtrate and the non-volatile matter of the paste were 1.9% by weight and 50.0% by weight, respectively.

[Evaluation 1 (Calculation of Average Particle Size Difference)]

SALD-2200 (laser diffraction particle size distribution measuring device) manufactured by Shimadzu Corporation was used to measure the average particle sizes of the resin-coated metal pigments obtained in Examples 1 to 8 and Comparative Example 1 to calculate the differences from the average particle size of the metal pigment before resin coating.

[Evaluation 2 (Dispersion State of Metal Pigment)]

The resin-coated metal pigments obtained in Examples 1 to 8 and Comparative Example 1 were each manually dispersed in a thinner using a micro spatula according to the following composition. After visually verifying that there is no lump of the metal pigment in the dispersion, one drop of the dispersion was dropped on a micro glass cover using a pipette with a capillary tip, and the drop was dried in an oven at 60° C. for 30 minutes. The dispersion state of the metal pigment was observed using an optical microscope and evaluated by counting the number of particles. In this evaluation, the observation was performed at a magnification of 3500 times using a digital microscope KH-7700 manufactured by Hirox, Co. Ltd.

Resin-coated metal pigment: 0.25 g
        (Examples 1 to 8, Comparative Example 1, in terms of aluminum), and Thinner: 25 g
        (a mixture of 30% of butyl acetate, 45% of toluene, 20% of isopropyl alcohol, and 5% of ethylcellosolve)

A proportion between (A) the number of particles in aggregates formed from two or more primary particles and (B) the number of primary particles which are not aggregated, B/(A+B), was calculated depending on the results of the observation, and it was evaluated as follows. (The larger the numerical value, the better the dispersion state. Practically, 0.3 or more are preferred.)

⊚ (Excellent): 0.9 or more
    ○ (Good): 0.6 or more and less than 0.9
    Δ (Acceptable): 0.3 or more and less than 0.6
    X (Unacceptable): Less than 0.3

[Evaluation 3 (Evaluation of the adhesiveness, chemical resistance, and gloss retention of coating film)]

The resin-coated metal pigments obtained in Examples 1 to 8 and Comparative Example 1 were each used to prepare a metallic paint according to the following composition.

Resin-coated metal pigment: 5 g
        (Examples 1 to 8, Comparative Example 1, in terms of aluminum)
    Thinner: 50 g
        (trade name "Pla Ace Thinner No. 2726", manufactured by Musashi Paint Co., Ltd.), and
    Acrylic resin: 33 g
        (trade name "Pla Ace No. 7160", manufactured by Musashi Paint Co., Ltd.)

The above paint was applied to an ABS resin plate using an air spray device so that a dry film having a thickness of 20 μm might be obtained, and the resulting film was dried in an oven at a temperature of 60° C. for 30 minutes to obtain coated plates for evaluation.

The above coated plates for evaluation were used for the evaluation of adhesiveness, chemical resistance, and gloss retention.

(Adhesiveness of Coating Film)

Using the coated plates prepared as described above, CELLOTAPE (registered trademark: CT405AP-18, manufactured by Nichiban Co., Ltd.) was allowed to be in close contact with the coating film and pulled at an angle of 45 degrees, and the degree of peeling of the metal pigment particles was visually observed. Depending on the results of the observation, the adhesiveness was evaluated as follows.

○ (Good): No peeling observed
    Δ (Acceptable): A little peeling observed
    X (Unacceptable): Peeling observed (Chemical Resistance of Coating Film)

The lower half of the coated plate prepared as described above was immersed in a 2.5 N NaOH aqueous solution in a beaker was put, and was allowed to stand at 23° C. for 24 hours. The coated plate after the test is washed with water and dried, and then an immersed part and a non-immersed part of the coated plate is measured for color according to the condition d (the 8-d method) of JIS-Z-8722 (1982) and determined for color difference ΔE by 6.3.2 of HS-Z-8730 (1980). Depending on the values of color difference ΔE, the chemical resistance was evaluated as follows. (The smaller the value, the better the chemical resistance.)

○ (Good): less than 1.0
    Δ (Acceptable): 1.0 or more and less than 2.0
    X (Unacceptable): 2.0 or more (Gloss Retention of Coating Film)

A gloss meter (Digital Variable Gloss Meter UGV-5D, manufactured by Suga Test Instruments Co., Ltd.) is used to measure the 60-degree gloss (both the incidence angle and the reflection angle are 60 degrees). A measured value of the 60-degree gloss of the coated plates as described above is represented by G'; a measured value of the 60-degree gloss of the coated plates similarly prepared using an aluminum powder that is not coated with a resin is represented by G; and the gloss retention R is determined by the following formula:

$$R=(G'/G)\times 100$$

The values of the gloss retention R were evaluated as follows. (The larger the numerical value, the better the gloss retention. Practically, 70 or more are preferred.)

⊚ (Excellent): 90 or more
    ○ (Good): less than 90 and 80 or more
    Δ (Acceptable): less than 80 and 70 or more
    X (Unacceptable): Less than 70

[Evaluation 4 (Measurement of the Amount of Gas Generated in a Specific Aqueous Coating)]

The resin-coated metal pigments obtained in Examples 1 to 8 and Comparative Example 1 were each used to prepare a specific aqueous coating according to the following composition.

Resin-coated metal pigment: 5 g
        (Examples 1 to 8, Comparative Example 1, in terms of aluminum)
    Butyl cellosolve: 40 g
    Water: 50 g, and
    Acrylic emulsion: 110 g
        (trade name "NeoCryl A-2091", manufactured by DSM)

The aqueous coating of 200 g was put in a 200-ml Erlenmeyer flask, and thereto was attached a measuring pipet with a rubber plug, followed by measuring the amount of gas generated after being allowed to stand for 8 hours at 40° C.

[Evaluation 5 (Unevenness of the Surface of Resin-Coated Metal Pigment, Measurement of Average Roughness)]

(1) Measurement of Surface Unevenness

First, the resin-coated metal pigment was subjected to ultrasonic cleaning with excess methanol and chloroform as a pretreatment, and then it was vacuum-dried, dispersed again in and cleaned again with acetone, and then air-dried. Then, it was embedded with an epoxy resin and completely cured, followed by trimming and cutting a section. The cross section was observed with a transmission electron microscope (hereinafter abbreviated as TEM) to observe the unevenness of the surface of the resin coating layer. The observation in which one field of view has a width of 1 μm was performed for five fields of view, and the maximum value from the height of a depression to that of a projection (the maximum value of unevenness) is measured.

(2) Average Surface Roughness: Ra

A line profile in which one field of view is 5 μm square of a resin-coated metal pigment (300 scans) was determined using an atomic force microscope (AFM). The arithmetic average surface roughness was determined from this. The same operation was performed for a total of three or more fields of view, and the arithmetic average value of them was defined as Ra.

(3) Average Height of Unevenness of a Surface Roughness Curve: Rc

The average height of unevenness of a surface roughness curve was determined from the same line profile as that used for determining the above (2). The same operation was performed for a total of three or more fields of view, and the arithmetic average value of them was defined as Rc.

The results of Evaluations 1 to 3 are shown in Table 1.

TABLE 1

| | Resin amount (%) | Evaluation 1 Average particle size difference between the particle size after resin coating and that before coating (μm) | Evaluation 2 Dispersion state of metal pigment | Evaluation 3 | | |
|---|---|---|---|---|---|---|
| | | | | Adhesiveness | Chemical resistance | Gloss retention |
| Raw material aluminum paste | | 0.0 (Basis) | ⊚ (Basis) | X | X | ⊚ (Basis) |
| Example 1 | 15.1 | 0.7 | ⊚ | ○ | ○ | ○ |
| Example 2 | 15.1 | 0.4 | ⊚ | ○ | ○ | ○ |
| Example 3 | 15.1 | 0.2 | ⊚ | ○ | ○ | Δ |
| Example 4 | 15.1 | 1.6 | ○ | ○ | ○ | ○ |
| Example 5 | 15.1 | 0.3 | ⊚ | ○ | ○ | ⊚ |
| Example 6 | 15.1 | 0.3 | ⊚ | ○ | ○ | ⊚ |
| Example 7 | 15.1 | 1.6 | Δ | ○ | ○ | ○ |
| Example 8 | 15.1 | 0.6 | ○ | ○ | ○ | ○ |
| Comparative Example 1 | 15.1 | 7.1 | X | ○ | Δ | X |

The results of Evaluations 4 to 5 are shown in Table 2.

TABLE 2

| | Resin amount (%) | Evaluation 4 Amount of gas generated (ml) | Evaluation 5 | | |
|---|---|---|---|---|---|
| | | | Maximum value of unevenness (nm) | Ra (nm) | Rc (nm) |
| Example 1 | 15.1 | 4 | 5 | 10 | 50 |
| Example 2 | 15.1 | 4 | 5 | 10 | 50 |
| Example 3 | 15.1 | 3 | 5 | 7 | 40 |
| Example 4 | 15.1 | 5 | 10 | 7 | 40 |
| Example 5 | 15.1 | 3 | 5 | 6 | 40 |
| Example 6 | 15.1 | 3 | 5 | 6 | 50 |
| Example 7 | 15.1 | 5 | 10 | 12 | 70 |
| Example 8 | 15.1 | 4 | 10 | 6 | 50 |
| Comparative Example 1 | 15.1 | 18 | 30 | 50 | 210 |

INDUSTRIAL APPLICABILITY

The resin-coated metal pigment of the present invention can be suitably used for metallic paints, printing ink, and plastic kneading applications, and when it is formed into a coating film, the resulting film is excellent in adhesiveness and chemical resistance and shows only a slight decrease in color tone. Therefore, the pigment has high availability as a paint for motor vehicles, household appliances, and the like.

The invention claimed is:

1. A resin-coated metal pigment, wherein a proportion between (A) the number of particles contained in aggregates formed from two or more primary particles and (B) the number of primary particles which are not aggregated, B/(A+B), in the resin-coated metal pigment, is 0.3 to 1,
   wherein the metal pigment is a scaly aluminum pigment, and
   wherein a measured value of the 60-degree gloss of a coated plate obtained by applying a paint containing said resin-coated metal pigment to an acrylic resin plate is represented by G'; a measured value of the 60-degree gloss of a coated plate similarly prepared using an aluminum powder that is not coated with a resin is represented by G; and a gloss retention R is determined by the following formula: $R=(G'/G)\times 100$; and the gloss retention R is 70 or more.

2. The resin-coated metal pigment according to claim 1, wherein unevenness of a resin coating layer adhering to a surface of the resin-coated metal pigment is 25 nm or less.

3. The resin-coated metal pigment according to claim 1, wherein the resin-coated metal pigment has an alkali resistance represented by color difference $\Delta E$ of less than 1.0, wherein the alkali resistance is evaluated by a method in which when a coated plate obtained by coating an acrylic resin with a coating material containing the resin-coated metal pigment is immersed in a 2.5 N sodium hydroxide solution at 20° C. for 24 hours, the alkali resistance is represented by color difference $\Delta E$ between an immersion part and a non-immersion part.

4. The resin-coated metal pigment according to claim 1, wherein the amount of gas generated is 10 ml or less when an aqueous coating material containing the resin-coated metal pigment is kept warm at 40° C. for 8 hours.

5. The resin-coated metal pigment according to claim 1, wherein a difference between an average particle size of particles of a resin-coated metal pigment and an average particle size of particles of a metal pigment before being coated with a resin is larger than 0 and 5 μm or less.

6. The resin-coated metal pigment according to claim 5, wherein unevenness of a resin coating layer adhering to a surface of the resin-coated metal pigment is 25 nm or less.

7. The resin-coated metal pigment according to claim 5, wherein the resin-coated metal pigment has an alkali resistance represented by color difference ΔE of less than 1.0, wherein the alkali resistance is evaluated by a method in which when a coated plate obtained by coating an acrylic resin with a coating material containing the resin-coated metal pigment is immersed in a 2.5 N sodium hydroxide solution at 20° C. for 24 hours, the alkali resistance is represented by color difference ΔE between an immersion part and a non-immersion part.

8. The resin-coated metal pigment according to claim 5, wherein the amount of gas generated is 10 ml or less when an aqueous coating material containing the resin-coated metal pigment is kept warm at 40° C. for 8 hours.

* * * * *